(12) United States Patent
Saint-Michel et al.

(10) Patent No.: US 12,308,712 B2
(45) Date of Patent: May 20, 2025

(54) STATOR FOR A ROTATING ELECTRICAL MACHINE

(71) Applicant: Moteurs Leroy-Somer, Angouleme (FR)

(72) Inventors: Jacques Saint-Michel, Angouleme (FR); Xavier Jannot, Angouleme (FR); Olivier Gas, Gond-Pontouvre (FR); Nicolas Langlard, Loos (FR); Sebastien Desurmont, Wasquehal (FR)

(73) Assignee: Moteurs Leroy-Somer, Angouleme (FR)

( * ) Notice: Subject to any disclaimer, the term of this patent is extended or adjusted under 35 U.S.C. 154(b) by 382 days.

(21) Appl. No.: 17/058,897

(22) PCT Filed: Jun. 4, 2019

(86) PCT No.: PCT/EP2019/064499
§ 371 (c)(1),
(2) Date: Nov. 25, 2020

(87) PCT Pub. No.: WO2019/234026
PCT Pub. Date: Dec. 12, 2019

(65) Prior Publication Data
US 2021/0203214 A1 Jul. 1, 2021

(30) Foreign Application Priority Data
Jun. 7, 2018 (FR) ...................................... 1854969

(51) Int. Cl.
*H02K 15/10* (2025.01)
*H02K 1/14* (2006.01)
(Continued)

(52) U.S. Cl.
CPC ............. *H02K 15/10* (2013.01); *H02K 1/148* (2013.01); *H02K 3/34* (2013.01); *H02K 15/021* (2025.01); *H02K 15/064* (2013.01)

(58) Field of Classification Search
CPC .......... H02K 1/148; H02K 3/34; H02K 3/345; H02K 15/105; H01B 13/106; H05K 3/32; H05K 3/34; H05K 3/345
See application file for complete search history.

(56) References Cited

U.S. PATENT DOCUMENTS 3,101,845 A * 8/1963 Heasley ................... H01B 3/04
428/401
5,259,827 A * 11/1993 Staniszewski ......... B65H 45/04
493/23
(Continued)

FOREIGN PATENT DOCUMENTS

DE 20111217 U1 * 9/2001 ............. H02K 3/345
DE 102004055608 A1 * 6/2006 ............... H02K 3/34
(Continued)

OTHER PUBLICATIONS

International Search Report (ISR) for PCT/EP2019/064499 mailed Sep. 3, 2019 (6 pages).

*Primary Examiner* — Livius R. Cazan
(74) *Attorney, Agent, or Firm* — Shumaker, Loop & Kendrick, LLP

(57) ABSTRACT

A method for manufacturing a stator of an electrical machine. The method including: a toothed ring having teeth joined together by bridges of material and defining between them slots open radially toward the outside, windings produced outside of the slots, and a yoke configured to be attached to the toothed ring. The method also including attaching at least one piece of sheet-form insulation to at least a portion of each of the windings, inserting said winding portions with the insulation into the slots via a (Continued)

radial movement directed toward the inside of the slots, and assembling the yoke onto the radially exterior surface of the ring to close the slots radially.

18 Claims, 5 Drawing Sheets

(51) Int. Cl.
  *H02K 3/34* (2006.01)
  *H02K 15/021* (2025.01)
  *H02K 15/064* (2025.01)

(56) References Cited

U.S. PATENT DOCUMENTS

| | | | |
|---|---|---|---|
| 6,198,190 B1 | 3/2001 | Umeda et al. | |
| 2003/0117034 A1 | 6/2003 | Fukuda et al. | |
| 2012/0091851 A1* | 4/2012 | Hearn | H02K 1/32 |
| | | | 310/214 |
| 2014/0035426 A1* | 2/2014 | Perry | H02K 3/30 |
| | | | 29/596 |
| 2015/0249372 A1* | 9/2015 | Sakaue | H02K 3/34 |
| | | | 310/203 |
| 2016/0181876 A1* | 6/2016 | Kawasaki | H02K 1/16 |
| | | | 310/198 |
| 2016/0181882 A1* | 6/2016 | Iwaki | H02K 3/345 |
| | | | 310/215 |
| 2019/0312480 A1* | 10/2019 | Yamazaki | H02K 3/48 |

FOREIGN PATENT DOCUMENTS

| | | | | |
|---|---|---|---|---|
| EP | 2595159 A2 | 5/2013 | | |
| FR | 3019947 A1 | 10/2015 | | |
| JP | 2010239721 A * | 10/2010 | | |
| WO | 9112133 A1 | 8/1991 | | |
| WO | WO-2009102015 A1 * | 8/2009 | ......... | H02K 15/0471 |
| WO | 2017111085 A1 | 6/2017 | | |
| WO | 2017170895 A1 | 10/2017 | | |

* cited by examiner

STATOR FOR A ROTATING ELECTRICAL MACHINE

TECHNICAL FIELD AND BACKGROUND

The present invention relates to rotating electrical machines, and more particularly to the stators of such machines. It also relates to the methods for manufacturing these machines.

In most known stators, the yoke forms slots that are fully open or semi-open toward the airgap, so as to allow the windings to be installed. In general, the semi-open slots accept electrical conductors of circular transverse section placed loosely, whereas the open slots house electrical conductors of rectangular transverse section placed in an ordered manner. In both cases, the electrical conductors are insulated from the stator mass by sheets inserted into the U-shaped slots and accepting the electrical conductors. In the case of a slot that accepts two windings with different phases, the windings with different phases are also separated from one another by an insulating sheet. The insulating sheet or sheets need to be held in position in the slots while the electrical conductors are being inserted.

U.S. Pat. No. 6,198,190 describes a stator having slots that are semi-open toward the airgap accepting U-shaped electrical conductors of rectangular transverse section. Such electrical conductors are inserted into the slots by sliding the electrical conductors in the slots along the longitudinal axis of the slots. The electrical conductors are insulated from the stator mass and from one another by an S-shaped insulator placed in the slots. The insulation is inserted into the slots before the electrical conductors are inserted.

Patent application FR 3 019 947 describes a stator comprising a toothed ring comprising teeth connected to one another by bridges of material and defining between them slots for receiving the coils, the slots being open radially toward the outside. The openings of the slots are closed by a yoke attached to the toothed ring.

SUMMARY

There is a need to have a method for manufacturing a rotating electrical machine stator that allows easy and efficient filling of the slots, while at the same time providing satisfactory electromagnetic performance.

The invention seeks more particularly to insulate the windings in the slots while limiting, as best as can be achieved, the risk of damage to the insulation and at the same time allowing rapid and easy placement of the windings in the slots.
Method The invention addresses this need, according to a first aspect, by means of a method for manufacturing a stator of an electrical machine, the method employing:
  a toothed ring comprising teeth joined together by bridges of material and defining between them slots open radially toward the outside,
  windings produced outside of the slots, and
  a yoke configured to be attached to the ring,
  the method comprising the following steps:
    attaching at least one piece of sheet-form insulation to at least a portion of each of the windings,
    inserting said winding portions with the sheet-form insulation into the slots via a radial movement directed toward the inside of the slots, and
    assembling the yoke onto the ring to close the slots radially.

The yoke is notably able to hold the windings in the slots after they have been inserted. The yoke may be assembled with the ring in a number of ways.

The fact that the slots are open radially toward the outside allows the windings to be inserted into the slots by a radial movement toward the inside of the slots. This makes installation of the windings easier, on the one hand insofar as access to the inside of the slots is easier, these being slots that are completely open and toward the outside rather than toward the airgap, and on the other hand insofar as the space available around the ring, for the necessary tooling, is far greater than the space available in the bore of the stator.

Fixing the sheet-form insulation to the windings allows the windings to be insulated from the edges of the slot, but also retains the conductors of the windings mechanically while the stator is being manufactured. This retention makes the windings easier to insert into the slots and reduces the space between the turns of the winding.

The insertion of the windings with the insulation into the slots is, in particular, made possible by the fact that the slots are open toward the outside, thereby increasing the space available for the insertion of the windings. The risk of damaging the insulation is reduced. In addition, the step of insulating the windings with respect to the surface of the slots is performed outside of the slots, making it easier and more reliable.

Finally, such insulation makes it possible to increase the range of options for arranging the insulation on the windings because there is no longer the need for the insulation to be open toward the opening of the slot in order to allow the insertion of the electrical conductors. That allows better insulating of the windings.

The method comprises a step of forming the windings prior to the step of securing the insulation.

The method may comprise a step of applying adhesive to the sheet-form insulation or to the corresponding winding portions prior to the step of securing the sheet-form insulation to each winding portion when the sheet-form insulation is not pre-coated with adhesive.

In instances in which the winding is of substantially rectangular cross section, the step of securing the sheet-form insulation to each of the winding portions may comprise the following substeps:
  laying the piece of sheet-form insulation out flat,
  positioning a first face of the winding on the sheet-form insulation, notably in the center of the piece of sheet-form insulation, by pushing the winding portion into contact with the piece of sheet-form insulation, notably by applying a pressure to a second face, opposite to the first face, in order to maintain contact between the sheet-form insulation and the first face of the winding,
  applying the two free sides of the piece of sheet-form insulation to two opposite lateral faces of the winding,
  folding one free flap of the piece of sheet-form insulation onto the second face then folding the remaining free flap of the piece of sheet-form insulation onto the second face, the piece of sheet-form insulation having a width, with respect to the corresponding winding, that is such that its ends become superposed with the second face, and
  applying a pressure to the second face of the winding.

Such a method of folding ensures that the piece of sheet-form insulation is held snugly against the winding portion, thereby avoiding the creation of creases in the piece of sheet-form insulation on the winding portion and limiting the risks of damage to the piece of sheet-form insulation as the windings are inserted into the slots and as the yoke is mounted on the ring.

The various steps in the securing of the insulation may be performed using a suitable folding device comprising flap-folding wings able to fold the piece of sheet-form insulation against the lateral faces, slides able to fold the two flaps of the piece of sheet-form insulation onto the second face and a retaining tool able to hold the winding in position and apply pressure to the second face of the winding. In addition, the presence of the bridges of material reduces the risk of loss of lacquer in the airgap when the complete stator is being impregnated with a lacquer. This makes it possible to reduce the need for cleaning.

It also makes it possible to reduce the leakage of lacquer into the airgap during operation of the machine on which the stator is mounted. This simplifies the maintenance of the machine.

The term "lacquer" should be understood here in a broad sense, including any type of impregnation material, notably polymer.

The stator can be used as a closed impregnation chamber simply by providing sealing at the ends of the stator only. The tooling is thus simplified. This also reduces the amount of lacquer lost and the cleaning operations.

Furthermore, such a stator greatly reduces the electromagnetic disturbances associated with the presence of the slots opening onto the airgap in the prior art. The absence of opening of the slots toward the airgap makes it possible to reduce the slot pulsation. The electromagnetic performance of the machine is improved.

Stator

Slot

At least one slot, and better still all the slots, may have mutually parallel opposing edges. The width of the slots is preferably substantially constant over their entire height.

At least one tooth, and better still all the teeth, may be of trapezoidal overall shape when viewed in section in a plane perpendicular to the axis of the stator.

As a preference, several bridges of material each have a deformable zone and, as a preference, all of the bridges of material each have a deformable zone. What is meant by a "deformable zone" is a zone of the bridge of material that deforms as a matter of preference upon a relative movement of the teeth that it connects. The deformation of the bridge of material may result in a lengthening or shortening of the circumferential dimension of the bridge of material, this leading to a lengthening or shortening of the circumferential dimension of the ring. The preferential deformation may be the result of a specific shape given to the bridge.

The deformable zone makes it possible to adapt to the mechanical stresses experienced by the ring as the ring is being assembled with the yoke. In addition, it makes it possible, if so desired, to have slots that are more widely open prior to the mounting of the yoke and therefore a greater clearance between the windings and the wall of the slots as the windings are being inserted, something which makes winding insertion easier and reduces the risk of damage to the insulation.

As a preference, the bridges of material each exhibit a zone of reduced magnetic permeability, notably in the form of at least one localized restriction, of at least one localized crushing, of at least one opening or of at least one localized treatment. The zone of reduced magnetic permeability of the bridge of material becomes magnetically saturated when the machine is in operation, thereby limiting the passage of flux and increasing the efficiency of the machine.

As a preference, the bottom of the slots each have at least one planar portion against which a winding, preferably of substantially rectangular cross section, bears. The planar portion or portions are substantially perpendicular to the radial axis of the slot.

The bottom of the slot may be flat, with the exception of a recess and/or of a deformable zone.

The deformable zone or the recess preferably forms a clearance between the bridge of material and the corresponding winding, something which may make it easier for a lacquer to penetrate when impregnating the stator.

This allows good filling of the slots by the windings in the case of windings of rectangular transverse section, by allowing the windings to rest flat in the bottom of the slot.

Yoke-Ring Interface

As a preference, the ring has reliefs on its radially exterior surface, collaborating, during the step of assembling the yoke onto the ring, with complementary reliefs belonging to the yoke. Such reliefs, through complementing shapes, allow the ring and the yoke to be kept fixed relative to one another. The collaborating reliefs are preferably of the dovetail and mortise type.

The method may comprise a preliminary step of manufacturing the ring, which involves a step of winding into a helix a strip of sheet metal comprising teeth which are connected by bridges of material, the opposing edges of each slot preferably becoming substantially mutually parallel when the strip is wound on itself to form the ring.

In a variant, the strip may be formed of sectors each comprising several teeth, the sectors being connected by links, these sectors being cut from a strip of sheet metal. The links may be flexible bridges connecting the sectors to one another and/or parts of complementing shapes, for example of the dovetail and mortise type, or complementing reliefs that come to bear against one another, notably when the ring is held in compression by the yoke.

The complementing shapes may be on the bridges of material so that the various sectors become assembled at the level of the bridges of material. As a preference, the assembling of the complementing shapes of the various sectors is performed away from the deformable and/or reduced-permeability zones of the bridges of material. This makes assembly easier, notably in the case of very large machines. For example, the sectors exhibit recessed shapes collaborating with complementing projecting shapes belonging to an adjacent sector.

In a variant, the step of manufacturing the ring may involve a step of stacking precut magnetic laminations.

In a further variant, the ring may be manufactured using additive manufacturing, for example using powder sintering.

The yoke may be produced by winding directly into a helix a strip of sheet metal if its width permits this, possibly, or possibly not, accompanied by the forming of suitable slots in said strip of sheet metal at the time of cutting out, so as to facilitate this winding, or by stacking precut magnetic laminations or slices produced by additive manufacturing, for example by powder sintering.

Windings

The windings may be placed in the slots in a concentrated or distributed manner.

What is meant by "concentrated" is that the windings are each wound around a single tooth.

What is meant by "distributed" is that at least one of the windings passes successively through two non-adjacent slots.

As a preference, the windings are placed in the slots as distributed windings, notably when the number of rotor poles is less than or equal to 8.

The windings each comprise at least one electrical conductor which may, in transverse section, be circular in shape, or in the shape of a polygon, notably with rounded corners, preferably rectangular in shape, this list being nonexhaustive.

When the conductors are circular in transverse section, they may be assembled according to a hexagonal winding. When the conductors are polygonal in transverse section, they may be assembled to form a winding in one or more rows oriented radially. Optimizing the assembly may allow a greater quantity of electrical conductors to be placed in the slots, and thus make it possible to obtain a stator of higher power, for the same volume.

The electrical conductors may be placed randomly in the windings. As a preference, the electrical conductors are arranged in the windings. What is meant by "arranged" is that the conductors are not placed in the windings randomly but are placed therein in an orderly manner. They are stacked in the windings non-randomly, for example being placed in one or more rows of aligned electrical conductors, notably in one or two rows, preferably in a single row.

As a preference, the electrical conductors are rectangular in transverse section and the windings are wound on edge. What is meant by "edge" is the narrow face of the wire of the winding, as opposed to the "flat". A winding that is wound on edge is a winding of which the wire, of oblong rectangular transverse section, comprising a direction of elongation, notably rectangular, is wound perpendicular to the flat. The wire is thus wound about an axis of winding that is perpendicular to the direction of elongation of its transverse section.

The electrical conductors are preferably electrically insulated from the outside by an insulating coating, notably an enamel.

As a preference, the winding portions that are inserted into the slots are each separated from the interior surface of the slot by at least one thickness of the corresponding piece of sheet-form insulation, and better still by at least two thicknesses of the corresponding piece of sheet-form insulation. Such a piece of sheet-form insulation allows better insulating of the windings with respect to the slot.

As a preference, during the step of inserting the winding portions, each slot accepts at least two winding portions, notably at least two winding portions with different phases. As a preference, these two winding portions are at least radially superposed in the slot.

The two winding portions in the same slot may be separated from one another by at least one thickness of sheet-form insulation, preferably at least two thicknesses of sheet-form insulation, and better still by at least four thicknesses of sheet-form insulation. Between the two winding portions situated in the one same slot, the greater the number of thicknesses of sheet-form insulation, the better the insulation is.

The windings form winding overhangs on the outside of the slots.

The method may comprise a step of separating two adjacent winding overhangs with different phases by using an additional piece of sheet-form insulation. The additional piece of sheet-form insulation may be secured between the two winding overhangs to at least part of one of two winding overhangs in a zone in which the two overhangs overlap.

As a preference, the windings are neither U-shaped ("U-pin") nor I-shaped ("I-pin") windings.

The method may involve a step of twisting ("skewing") the stator. Such skewing may contribute to tightening the windings in the slots and to reducing the slot harmonics.

Insulation

The sheet-form insulation may be made of any electrically insulating material, preferably flexible, notably made of aramid, for example of Nomex®, or may be made of a laminate of aramid and of polyester or of polyimide, for example made of a Nomex® laminate of NMN (Nomex®-Mylar®-Nomex®) type or of NKN (Nomex®-Kapton®-Nomex®) type, or made of mica/polyester.

As a preference, the pieces of sheet-form insulation extend over rectilinear winding portions.

As a preference, the pieces of sheet-form insulation extend only over rectilinear winding portions, the curved portions of the windings being without sheet-form insulation.

As a preference, the pieces of sheet-form insulation are secured to the windings over at least part of their surface, and better still over their entire surface, using adhesive bonding. The bonding of the sheet-form insulation can be done using an adhesive over all or part of the sheet-form insulation and/or over all or part of the corresponding winding portion, or using an adhesive tape. As an alternative, each piece of sheet-form insulation is secured to the winding portion at least at one of its longitudinal ends, preferably at both of its longitudinal ends, using adhesive bonding with an adhesive on the piece of sheet-form insulation, or directly on the windings, or using at least one adhesive tape, for example straddling the sheet-form insulation and the winding portion.

As a preference, each winding portion is covered with a single piece of sheet-form insulation.

In a variant, each winding portion is covered with at least two pieces of sheet-form insulation superposed with one another at least in part or with touching edges, notably with two pieces of sheet-form insulation formed into a U and fixed top to tail over the corresponding winding portion.

As a preference, the pieces of sheet-form insulation extend, after the winding portions have been inserted into the slots, over the entire height of the slots.

As a preference, the pieces of sheet-form insulation protrude axially out of the slots on each side of the latter after insertion.

In a variant, the insulation is of a height substantially equal to the height of the slots so that the insulation fits snugly into the slots without protruding beyond them. This may prove advantageous in the case of low-voltage machines.

The pieces of sheet-form insulation extend over a length greater than or equal to the height of the slots.

Each piece of sheet-form insulation may be wrapped one or more times around the corresponding winding portion. As a preference, the pieces of sheet-form insulation pass at least once, and better still at least twice, around the corresponding winding portion.

The pieces of sheet-form insulation may each comprise two opposing longitudinal edges extending substantially along the longitudinal axis of the associated winding portion. As a preference, in that case, the pieces of sheet-form insulation are made of aramid or of a laminate of aramid and of polyester or polyimide.

As a preference, the winding portions are rectangular in transverse section and the two opposing longitudinal edges of each piece of sheet-form insulation extend over the one same face of the corresponding winding portion.

The longitudinal edges of each piece of sheet-form insulation may be in contact with one another on said face. In that case, the pieces of sheet-form insulation pass once around the corresponding winding portion.

In a variant, each piece of sheet-form insulation may become at least partially superposed on itself. In that case, the pieces of sheet-form insulation pass more than once around the winding portion. As a preference, the insulation is then at least coated with adhesive on its surface proximate to at least one of the longitudinal edges.

As a preference, the two longitudinal edges of the piece of sheet-form insulation extend over the one same face of the winding portion when the winding is of rectangular cross section. The sheet-form insulation is notably secured to the winding portion using the method described hereinabove. In that case, it may be that only the two flaps folded over onto the second face are coated with adhesive.

As a preference, each winding portion is placed in the corresponding slot in such a way that the longitudinal edges of the corresponding piece of sheet-form insulation extend over a face of the winding portion that is oriented toward the opening of the slot or toward a portion of a winding, notably with a different phase, inserted in that same slot.

As a preference, in instances in which each slot accepts at least two windings and in which the insulation passes once around the corresponding winding portion, each winding portion is placed in the corresponding slot in such a way that the longitudinal edges of the corresponding piece of sheet-form insulation extend over a face of the winding portion that is oriented toward the opening of the slot. The two winding portions with different phases are thus separated by two thicknesses of sheet-form insulation with at least one of the thicknesses of insulation being continuous.

As a preference, in instances in which each slot accepts at least two windings and in which each insulation passes more than once around the corresponding winding portion, each winding portion is placed in the corresponding slot in such a way that the longitudinal edges of the corresponding piece of sheet-form insulation extend over a face of the winding portion that is oriented toward the other winding portion, notably of different phase. The windings with different phases are then separated by four thicknesses of insulation.

In a variant, in instances in which each slot accepts at least two windings, the longitudinal edges of each piece of sheet-form insulation may be spaced apart from one another by a distance shorter than the width of the face with which they are superposed, and each winding portion is placed in the corresponding slot in such a way that the longitudinal edges of the corresponding piece of sheet-form insulation extend over a face of the winding portion that is oriented toward the opening of the slot. The two winding portions with different phases are thus separated by two thicknesses of sheet-form insulation with at least one of the thicknesses of insulation being continuous.

In a variant, the sheet-form insulation may take the form of a tape wound around the winding portion. In that case, the sheet-form insulation passes a plurality of times around the corresponding winding portion. As a preference, the tape is superposed on itself from one turn around the winding portion to the next. In that case, the sheet-form insulation is preferably made of mica/polyester.

Stator

Yet another subject of the invention, according to a second aspect, is a stator comprising:

a radially interior ring, comprising:
teeth creating between them slots open radially toward the outside, and
bridges of material each connecting two adjacent teeth at their base on the side of the airgap and defining the bottom of the slot between these teeth, and
a radially exterior yoke attached to the ring,
windings placed in the slots, with, per slot, at least a winding of a first phase and a winding of a second phase different than the first phase, these windings being separated within the slot by at least two thicknesses of one or more pieces of sheet-form insulation, one piece of sheet-form insulation at least partially surrounding each of these windings.

The features described hereinabove in connection with the first aspect of the invention also apply to this second aspect.

Machine and Rotor

A further subject of the invention is a rotating electrical machine comprising a stator as defined hereinabove. The machine may or may not be synchronous. The machine may be a reluctance machine. It may constitute a synchronous motor.

The rotating electrical machine may comprise a wound rotor or a permanent-magnet rotor.

BRIEF DESCRIPTION OF THE DRAWINGS

The invention may be better understood from reading the following detailed description of nonlimiting exemplary embodiments thereof, and from studying the attached drawing in which.

DETAILED DESCRIPTION

Figure 1:
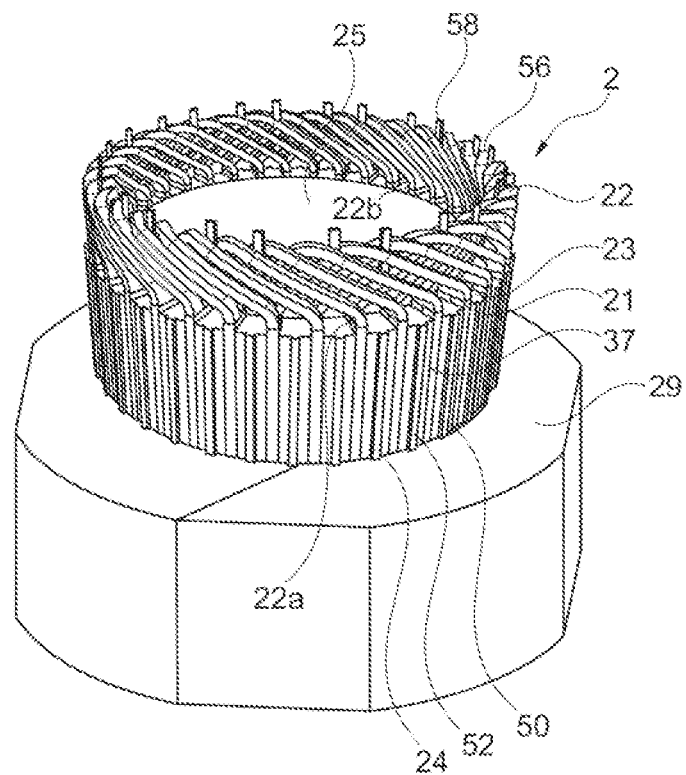
FIG. 1 is a schematic and partial perspective view of a stator according to the invention, the yoke being partially attached to the ring.

FIGS. 1 to 5 depict a stator 2 of a rotating electrical machine. The stator makes it possible to generate a rotary magnetic field driving the rotation of a rotor, in the context of a motor, and, in the case of an alternator, the rotation of the rotor induces an electromotive force in the stator windings.

The examples illustrated hereinbelow are schematic and are not necessarily depicted to scale.

Stator

The stator 2 comprises windings 22 which are placed in slots 21 formed between teeth 23 of a toothed ring 25. The slots 21 are closed on the side of the airgap by bridges of material 27 each joining together two consecutive teeth of the ring 25 and having a radial opening 28 toward the outside of the ring 25.

The stator 2 comprises a yoke 29 attached to the ring 25. The yoke 29 has recessed reliefs 50 of the mortise type collaborating with projecting reliefs of the dovetail type 52 belonging to the toothed ring 25, for mounting the yoke 29 on the ring 25.

The slots 21, in the example described, have mutually parallel radial edges 33 and, in section in a plane perpendicular to the axis of rotation X of the machine, are substantially rectangular in shape.

The bottoms of the slots 35 are of a shape substantially complementing that of the windings 22. In the example of FIGS. 1 to 4, the bottoms of the slots 35 have two planar portions 30 one on each side of the recess 40 and against which the rectangular windings 22 bear. The bottoms of the slots 35 are connected to the radial edges 33 by fillets 36.

The bridges of material 27 may be of constant thickness, as illustrated, and may be substantially nondeformable. In a variant which has not been illustrated, the bridges of material 27 each have a zone of reduced magnetic permeability, notably a localized restriction, a crushing of material, a localized treatment or one or more openings, allowing the lamination to become magnetically saturated, thereby limiting the passage of magnetic flux, and/or each have a deformable zone making it possible to vary the circumferential diameter of the ring 25.

The ring 25 and/or the yoke 29 are each formed of a pack of magnetic laminations which are stacked along the axis X, the laminations being, for example, identical and exactly superposed. They may be held together by clipping, by rivets, by tie rods, by welding and/or by any other technique. The magnetic laminations are preferably made of magnetic steel.

The ring 25 and/or the yoke 29 may alternatively be formed of one or more strip(s) of sheet metal cut out and wound on itself (themselves).

Windings and Insulation

The windings 22 may be placed in the slots 21 in a concentrated or distributed manner, preferably a distributed manner.

Figure 2:
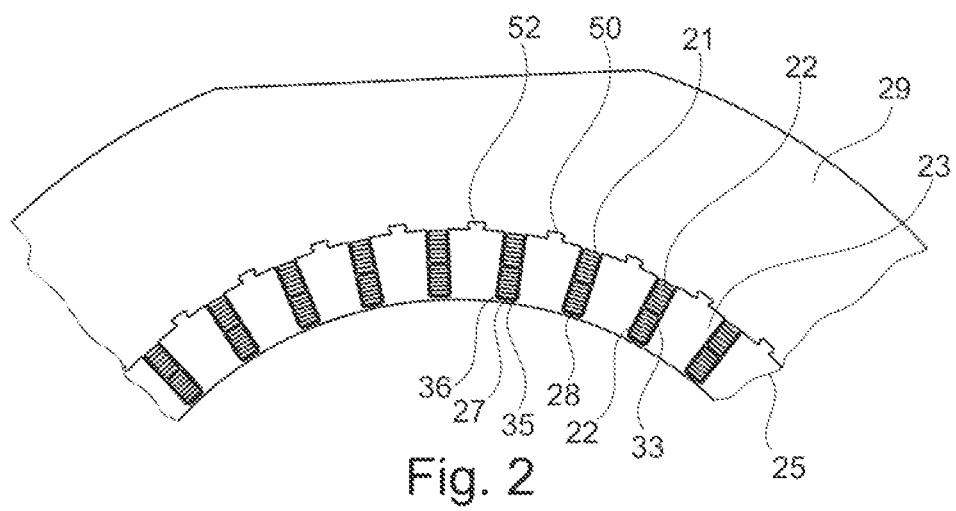
FIG. 2 is a schematic view in transverse section of the stator of FIG. 1.

In the example illustrated in FIG. 2, the electrical conductors 34 of the windings 22 are placed in the slots in an arranged orderly manner.

Figure 4:
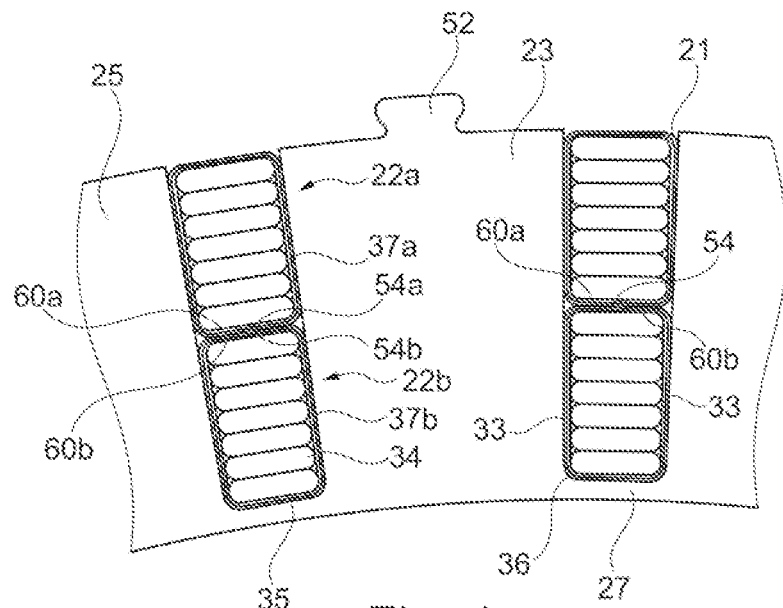
FIG. 4 is a detail of a view in transverse section of FIG. 3.

As visible in FIG. 4, the electrical conductors 34 preferably have a rectangular flattened transverse section and are radially superposed, for example in a single row. They are superposed on one another via the flat. The windings 22 are said to be wound edge-on. The windings 22 may, in transverse section, be substantially rectangular in shape.

In the examples illustrated, the windings 22 have a single radial row of electrical conductors 34. However, the windings 22 may have a plurality of radial rows of electrical conductors, for example two rows of electrical conductors.

Each slot 21 is able to accept two stacked winding portions 22a and 22b, with different phases. Each winding 22 may, in transverse section, be substantially rectangular in shape.

In the example illustrated in FIG. 4, each slot 21 accepts two winding portions 22a and 22b with different phases.

Each winding portion 22a and 22b intended to be engaged in a slot 21 is surrounded with a sheet of insulation 37a and 37b able to insulate the windings from the walls 33 and 36 of the slot and to insulate from one another the winding portions 22a and 22b with different phases.

The windings 22 are formed outside of the slots 21 and their portions 22a and 22b that are intended to be engaged in the slots are each surrounded with a sheet of insulation 37a or 37b. The sheet of insulation 37a or 37b is coated with adhesive over at least part of its surface and the winding portions 22a and 22b with the sheets of insulation 37a and 37b on them are inserted into the slots 21. This operation is made easier by the fact that the slots 21 are fully open radially toward the outside.

Figure 3:
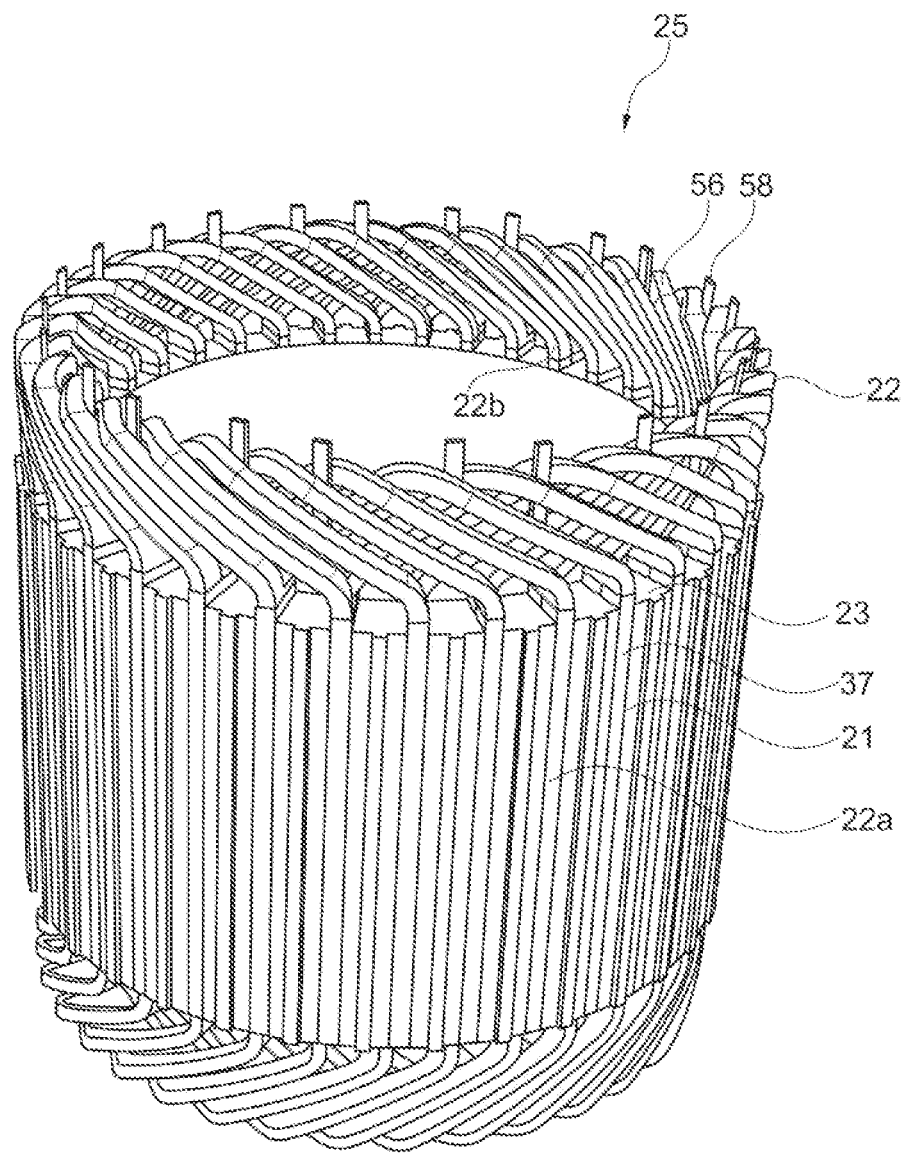
FIG. 3 is a schematic perspective view of the ring of the stator with the windings.

Each sheet of insulation 37a or 37b extends over the entire height of the winding portion 24a or 24b inserted in the corresponding slot 21. As a preference, and as illustrated in FIG. 3, the sheets of insulation 37a or 37b may extend axially out of the slots 21 on each side of the ring 25.

The sheets of insulation 37a and 37b may have a layer of adhesive over their entire surface, so that they can be secured by adhesive bonding to the corresponding winding portion 24a and 24b. As an alternative, the sheets of insulation 37a and 37b are secured to the winding portions 22a and 22b by any other means.

The sheets of insulation 37a and 37b may be made of aramid, for example of Nomex®, or may be made of a laminate of aramid and of polyester or of polyimide, for example made of a Nomex® laminate of NMN (Nomex®-Mylar®-Nomex®) type or of NKN (Nomex®-Kapton®-Nomex®) type.

Figure 5:
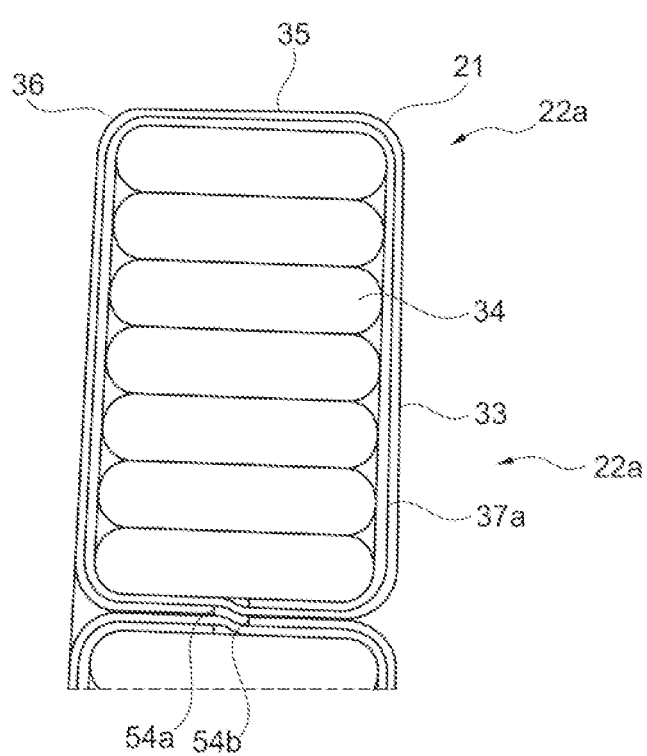
FIG. 5 depicts a detail of FIG. 4, FIGS. 6A, 6B, and 6C depict variants of FIG. 4.

As has been illustrated in FIGS. 4 and 5, each sheet of insulation 37a or 37b may be wrapped twice around the corresponding winding portion 22a or 22b. The winding portion 22a or 22b is therefore insulated from the slot 21 by two thicknesses of the corresponding sheet of insulation 37a or 37b.

The longitudinal edges 54a or 54b of the sheets of insulation 37a or 37b extend over the same face 60a or 60b of the winding portion 24, particularly over a face 60a or 60b of the winding 22 corresponding to the flat of the electrical conductors 34. The winding portions 22a and 22b are oriented in the slots 21 in such a way that the faces 60a face the faces 60b. Thus, the winding portions 22a and 22b with different phases that are in the one same slot are separated from one another by two thicknesses of insulation 37a and by two thicknesses of insulation 37b, namely by four thicknesses of insulation.

As illustrated in FIG. 3, the windings 22 form winding overhangs 56 on the outside of the slots.

The winding overhangs 56 of adjacent windings 22 with different phases have connection portions 58 that are without any insulation.

Rotor

The rotor 1 depicted in FIG. 1 comprises a central opening 5 for mounting on a shaft and comprises a magnetic rotor mass 3 extending axially along the axis of rotation X of the rotor, this rotor mass being formed for example by a pack of magnetic laminations stacked along the axis X, the laminations being, for example, identical and exactly superposed.

The rotor 1 for example comprises a plurality of permanent magnets 7 placed in housings 8 of the magnetic rotor mass 3. As an alternative, the rotor is a wound rotor.

Method for Manufacturing the Stator and Machine

The stator may be obtained using the method of manufacture which will now be described.

The windings 22 are wound, notably on edge, by winding the electrical conductors 34. The windings 22 have rectilinear portions 22a and 22b which are intended to be inserted into the slots 21. These rectilinear portions 24 are surrounded with sheet-form insulation 37a or 37b, each sheet of insulation 37a or 37b being as described hereinabove. The sheets of insulation 37a or 37b are secured to the corresponding winding portion 22a or 22b by adhesive bonding or by some other means. The sheets of insulation 37a or 37b provide the windings with insulation from the pack of laminations and from each other.

Figure 9:
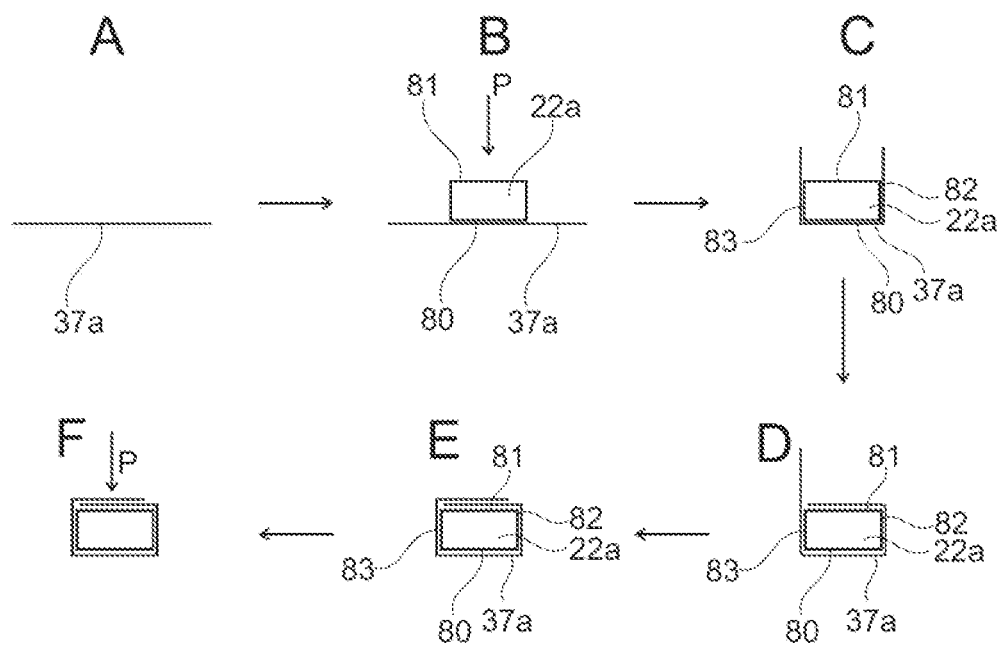
FIG. 9 illustrates a method for securing the insulation to the winding portion.

The pieces of sheet-form insulation 37a and 37b may be secured to the winding portions 22a and 22b using the method illustrated in FIG. 9:

A. The sheet-form insulation 37a is first of all placed flat on a platform of a folding device, not depicted.

B. A first face 80a of the winding portion 22a that is to be insulated is set down on the insulation, applying a pressure P using a retaining tool on a second face 81 opposite to the first face 80, C. The two free sides of the piece of sheet-form insulation 37a, which extend on either side of the winding portion 22a, are folded over and smoothed out simultaneously or otherwise onto the lateral faces 82 and 83 using flap-folding wings of the platform of the folding device, D. The free flap of the piece of sheet-form insulation 37a extending from the face 82 is folded over onto the second face 81 using a slide sliding along the second face 81 starting from the face 82 or from a flap-folding wing of the platform of the folding device, E. The free flap of the piece of sheet-form insulation 37a extending from the face 83 is folded over onto the portion of sheet-form insulation folded over in step D onto the second face 81. This step is performed using a slide sliding along the second face 81 starting from the face 83.

F. A pressure P is applied to the second face 81, using the retaining tool of the folding device.

In the method described hereinabove, the piece of sheet-form insulation 37a is coated with adhesive. In a variant, the winding portion 22a is coated with adhesive and a layer of adhesive is applied to the piece of sheet-form insulation superposed with the second face 81 between steps D and E in order to allow the securing of the portion of sheet-form insulation that is folded over in step E.

The invention is not restricted to this method of adhesive application or to the use of an adhesive-coating device, it being possible for the application of adhesive to be performed by hand.

Next, the rectilinear portions 22a and 22b of the windings 22 surrounded with the sheets of insulation 37a or 37b are inserted into the slots 21 of the ring 25 by a radial movement toward the inside of the slots 21. Two rectilinear winding portions 22 with different phases are inserted successively into the one same slot 21. The two rectilinear portions 22a and 22b of windings 22 belonging to a slot 21 are superposed radially and oriented in such a way that the faces 60 of the two windings are oriented toward one another.

In an additional step, the yoke 29 is attached to the ring 27 by sliding the dovetails 52 in the mortises 50. The yoke 29 may be heated beforehand in order to expand it and make it easier to insert over the ring 25. After it has been inserted over the ring 25, it may shrink as it cools, making it possible to achieve minimal clearance between the ring 25 and the yoke 29.

As a variant or in addition, the ring 25 may be cooled beforehand in order to shrink it and make the insertion of the yoke 29 easier.

Figure 6A:
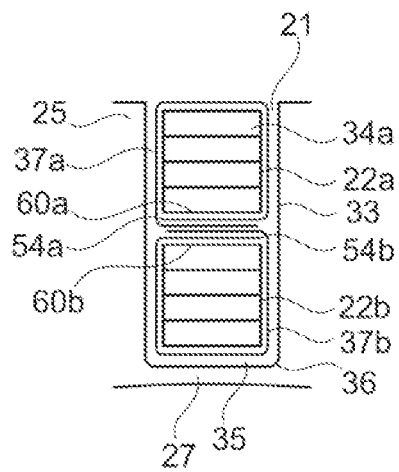
Figure 6B:
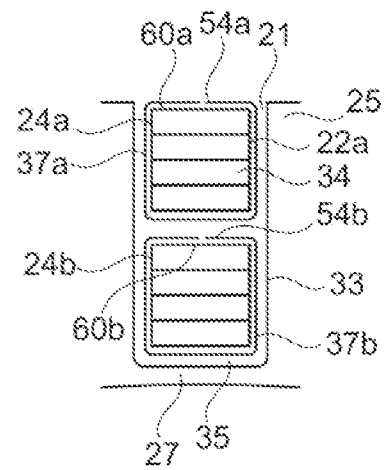

The embodiments illustrated in FIGS. 6A and 6B differ from those of FIGS. 1 to 5 in terms of the way in which the sheets of insulation 37a and 37b are wrapped around the winding portions 22a and 22b.

In the embodiment illustrated in FIG. 6A, the sheets of insulation 37a and 37b are wrapped around the corresponding winding portion 22a or 22b over a little more than one turn. Each longitudinal edge 54a or 54b of the sheet of insulation 37a or 37b becomes superposed with a layer of the same sheet of insulation 37a or 37b and with a same face 60a or 60b of the windings. Thus, the winding portions 22a and 22b are insulated from the slot by a single thickness of insulation 37a or 37b and are insulated from one another by two thicknesses of insulation 37a and by two thicknesses of insulation 37b, namely by four thicknesses of insulation.

In the embodiment illustrated in FIG. 6B, the sheets of insulation 37a and 37b are wrapped in such a way that their longitudinal edges 54a and 54b face one another on the faces 60a and 60b without becoming superposed. The winding portions 22a and 22b of a slot 21 are placed in the slots 21 in such a way that the faces 60a and 60b with which the longitudinal edges 54a and 54b of the pieces of sheet-form insulation 37a and 37b become superposed are both oriented toward the opening 28. The winding portions 22a and 22b are insulated from the slot 21 by one thickness of the sheet of insulation 37a or 37b, and are insulated from one another by a discontinuous thickness of insulation 37b and a continuous thickness of insulation 37a. In this embodiment, the surface of the winding portion 22a or 22b may be coated with adhesive in place of or in addition to the adhesive-coating of the sheet-form insulation.

Figure 6C:
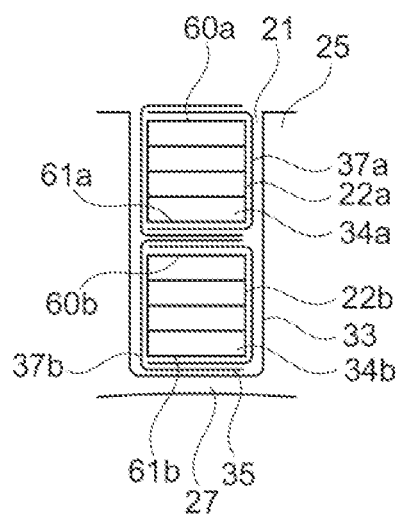

In the embodiment illustrated in FIG. 6C, each winding portion 22a and 22b is insulated from the outside by two pieces of sheet-form insulation 37a or 37b shaped into a U. The two pieces of sheet-form insulation 37a or 37b are placed around the corresponding winding portion 22a or 22b head to tail and overlap at least partially, notably overlapping on the faces 60a and 61a or 60b and 61b oriented toward the airgap and the opening of the slot 21. The winding portions 22a and 22b are insulated from the slot 21 by one thickness of the sheets of insulation 37a or 37b, and are insulated from one another by two thicknesses of insulation 37a and 37b, each of the thicknesses being formed by one of the pieces of sheet-form insulation 37a or 37b.

Figure 7:
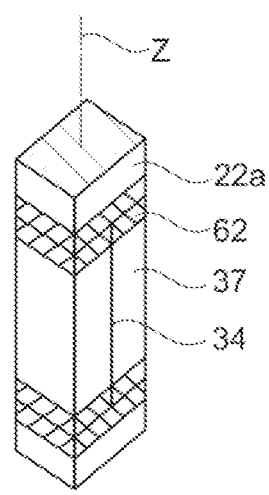
FIG. 7 depicts a variant of the securing of the sheet of insulation to a winding portion.

In the variant illustrated in FIG. 7, the sheet-form insulation 37a or 37b is not stuck to the surface of the corresponding winding portion 22a, but is attached using adhesive tape 62 at its two ends.

Figure 8:
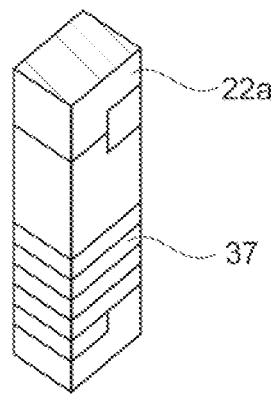
FIG. 8 depicts a variant of the securing of the sheet of insulation to a winding portion.

In the variant illustrated in FIG. 8, the sheet-form insulation 37a or 37b is an adhesive tape which is wrapped around the winding portion 22a. The consecutive turns of the tape partially overlap in order to provide good insulation. In this embodiment, the adhesive tape is preferably made of mica/polyester.

Of course, the invention is not limited to the exemplary embodiments that have just been described, and the rotor can be a wound rotor rather than a permanent-magnet rotor.

The expression "having a" should be understood to be synonymous with "comprising at least one".

The invention claimed is:

1. A method for manufacturing a stator of an electrical machine, the method employing:
    a toothed ring comprising teeth joined together by bridges of material and defining between them slots open radially toward the outside,
    windings produced outside of the slots, and
    a yoke configured to be attached to the toothed ring,
    the method comprising:
        attaching at least one piece of sheet-form insulation to at least a portion of each of the windings, the pieces of sheet-form insulation each comprising two opposing longitudinal edges extending substantially along the longitudinal axis of the associated winding portion, the winding portions being rectangular in transverse section and the two opposing longitudinal edges of each piece of sheet-form insulation extending over the one same face of the corresponding winding portion, the longitudinal edges of each piece of sheet-form insulation being in contact with one another on said face or opposing each other without being superposed,
inserting said winding portions with the insulation into the slots via a radial movement directed toward the inside of the slots, and
assembling the yoke onto the radially exterior surface of the ring to close the slots radially,
the winding portions that are inserted into the slots being each separated from the interior surface of the slot by at least two thicknesses of sheet-form insulation and being separated from each other by at least four thicknesses of sheet-form insulation.

2. The method as claimed in claim 1, wherein once the windings with the insulation have been inserted into the slots, the insulation extends in each slot over the entire height of the slot.

3. The method as claimed in claim 2, the pieces of sheet-form insulation protruding axially out of the slots on each side of the latter after insertion.

4. The method as claimed in claim 1, each winding portion being placed in the corresponding slot in such a way that the longitudinal edges of the corresponding piece of sheet-form insulation extend over a face of the winding portion that is oriented toward the opening of the slot or toward a portion of a winding.

5. The method as claimed in claim 1, wherein the pieces of sheet-form insulation are secured to the windings over at least part of their surface.

6. The method as claimed in claim 1, wherein each piece of sheet-form insulation is secured to the winding portion at least at one of its longitudinal ends, using adhesive bonding on all or part of the piece of sheet-form insulation and/or on all or part of the corresponding winding portion, or using at least one adhesive tape.

7. The method as claimed in claim 1, each winding portion being covered with a single piece of sheet-form insulation.

8. The method as claimed in claim 1, wherein, during the step of inserting the winding portions, each slot accepts at least two winding portions.

9. The method as claimed in claim 8, each winding portion being placed in the corresponding slot in such a way that the longitudinal edges of the corresponding piece of sheet-form insulation extend over a face of the winding portion that is oriented toward the other winding portion.

10. The method as claimed in claim 1, the sheet-form insulation being made of a flexible electrically insulating material.

11. The method as claimed in claim 1, the pieces of sheet-form insulation extending only over rectilinear winding portions.

12. The method as claimed in claim 1, the winding portions being each inserted into the slots such that the longitudinal edges of the corresponding sheet-form insulation extends over a face of the winding portion that is oriented toward the opening of the slot.

13. A stator comprising:
a radially interior ring, comprising:
teeth creating between them slots open radially toward the outside, and
bridges of material each connecting two adjacent teeth at their base on the side of the airgap and defining the bottom of the slot between these teeth, and
a radially exterior yoke attached to the ring,
windings placed in a distributed manner in the slots, with, per slot, at least a winding of a first phase and a winding of a second phase different than the first phase,
for each winding portion within a slot, at least two pieces of sheet-form insulation,
the two pieces of sheet-form insulation surrounding each of the winding portions, these winding portions being separated from each other within the slot by at least four thicknesses of sheet-form insulation, the pieces of sheet-form insulation for each winding portion being distinct from the pieces of sheet-form insulation for any other winding portion.

14. A stator comprising:
a radially interior ring, comprising:
teeth creating between them slots open radially toward the outside, and
bridges of material each connecting two adjacent teeth at their base on the side of the airgap and defining the bottom of the slot between these teeth, and
a radially exterior yoke attached to the ring,
windings placed in a distributed manner in the slots, with, per slot, at least a winding of a first phase and a winding of a second phase different than the first phase,
a single piece of sheet-form insulation for each winding portion within a slot,
the winding portions within a slot being separated within the slot by at least two thicknesses of sheet-form insulation and being separated from each other by four thicknesses of sheet-form insulation.

15. A method for manufacturing a stator of an electrical machine, the method employing:
a toothed ring comprising teeth joined together by bridges of material and defining between them slots open radially toward the outside,
windings produced outside of the slots, and
a yoke configured to be attached to the toothed ring,
the method comprising:
attaching at least two pieces of sheet-form insulation directly to at least a portion of each of the windings,
inserting each winding portion with the at least two pieces of sheet-form insulation fastened thereon into the slots via a radial movement directed toward the inside of the slots, and
assembling the yoke onto the radially exterior surface of the ring to close the slots radially,
wherein the winding portions that are inserted into the slots are each separated from each other by at least four thicknesses of sheet form insulation.

16. The method as claimed in claim 15, each winding portion being covered with at least two pieces of sheet-form insulation superposed with one another at least in part or with touching edges.

17. The method as claimed in claim 15, each winding portion being covered with two pieces of sheet-form insulation formed into a U and fixed top to tail over the corresponding winding portion.

18. The method as claimed in claim 15, wherein the winding portions that are inserted into the slots are each separated from the interior surface of the slot by at least one thickness of sheet-form insulation.

* * * * *